United States Patent
Star

(10) Patent No.: US 6,324,965 B1
(45) Date of Patent: Dec. 4, 2001

(54) BYPASS MECHANISM FOR BULK INGREDIENT BEVERAGE DISPENSER

(76) Inventor: Spencer Star, 63 Harborview Dr., Richmond, CA (US) 94804

( * ) Notice: Subject to any disclaimer, the term of this patent is extended or adjusted under 35 U.S.C. 154(b) by 0 days.

(21) Appl. No.: 09/477,742

(22) Filed: Jan. 4, 2000

(51) Int. Cl.[7] .................................................. A47J 31/00
(52) U.S. Cl. .......................... 99/289 R; 99/290; 222/134; 222/142; 222/238
(58) Field of Search .................... 99/289 R, 290, 99/323.3; 222/236, 237, 238, 142, 134

(56) References Cited

U.S. PATENT DOCUMENTS

| | | | |
|---|---|---|---|
| D. 310,003 | 8/1990 | King | D7/309 |
| 4,191,101 * | 3/1980 | Ogawa et al. | 99/289 X |
| 4,688,474 * | 8/1987 | Anderl | 99/289 R |
| 4,974,751 | 12/1990 | King | 222/142 |
| 5,094,153 * | 3/1992 | Helbling | 99/289 X |
| 5,351,604 | 10/1994 | King et al. | 99/289 R |
| 5,408,918 * | 4/1995 | King et al. | 99/289 R |
| 5,644,973 * | 7/1997 | Kang et al. | 99/289 R |
| 5,913,963 | 6/1999 | King | 99/302 P |
| 5,974,950 | 11/1999 | King | 99/289 R |

* cited by examiner

Primary Examiner—Reginald L. Alexander
(74) Attorney, Agent, or Firm—James D. Ivey

(57) ABSTRACT

A bypass chute is included with a bulk ingredient beverage brewer/dispenser such that bypass chute accepts an alternative ingredient directly from a user. In conventional operation, a bulk ingredient is moved through a guide and into a brew device chamber for brewing. However, in a bypass mode, an alternative ingredient is introduced into the bypass chute by the user and the bulk ingredient is not used.

8 Claims, 3 Drawing Sheets

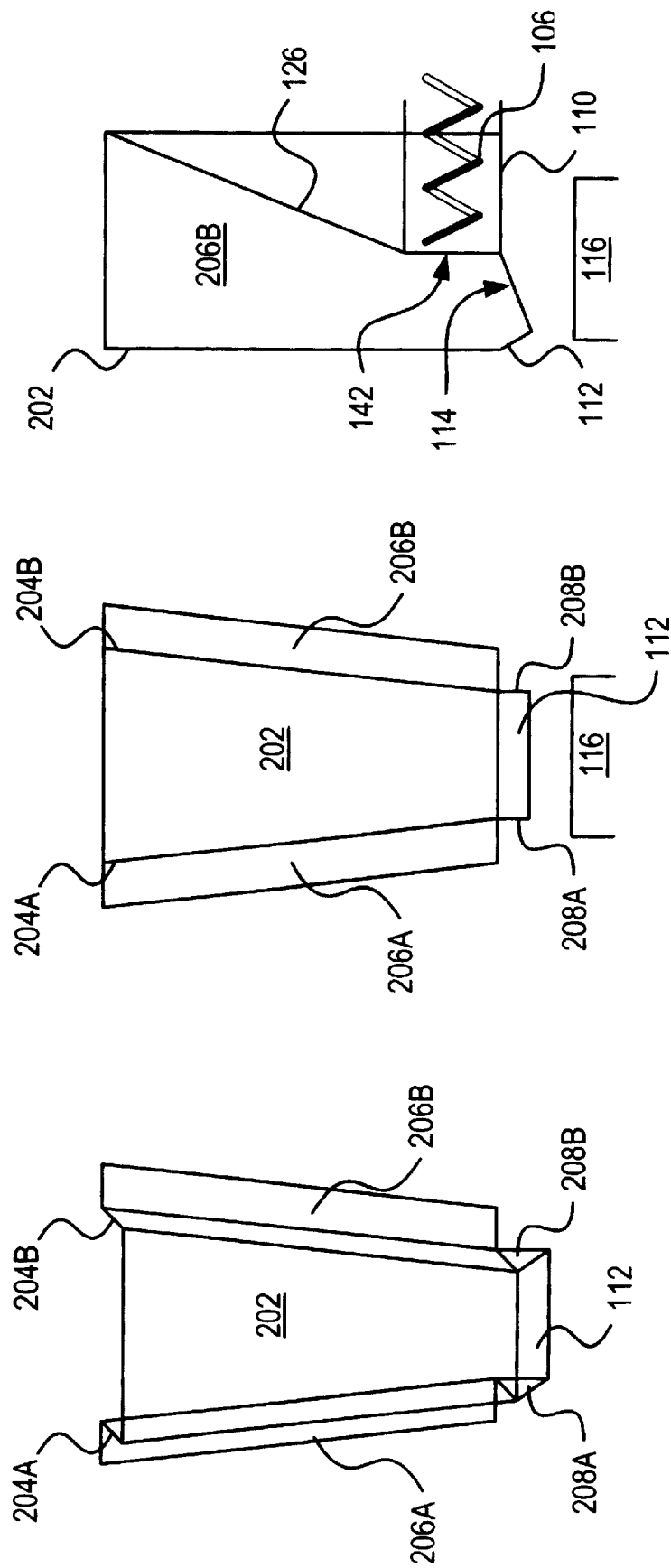

BYPASS MECHANISM FOR BULK INGREDIENT BEVERAGE DISPENSER

FIELD OF THE INVENTION

The present invention relates to dispensers such as coffee dispensers and, in particular, to a mechanism by which a bulk ingredient hopper and dispenser is bypassed to allow a user to substitute an alternative ingredient for the bulk ingredient.

BACKGROUND OF THE INVENTION

Automated coffee brewers and dispensers are currently in use and are popular in numerous offices and places of business. Such coffee brewer/dispensers typically store ground coffee beans in a large, bulk hopper and move a small amount of ground coffee beans into a brew device when a cup of coffee is requested by a user. Within the brew device, the ground coffee beans are mixed with hot water and then filtered out to leave brewed coffee which is then dispensed to the user.

While such a system works very well, there are shortcomings. First, the user is typically limited to a selection of one or two types of beverage. For example, a dual dispenser assembly is described in U.S. Pat. No. 4,974,751 to King. While the '751 Patent describes a dual bulk hopper for dispensing either regular or decaffeinated coffee (or either of two beverage ingredients), the user is limited to a choice of two ingredients.

As gourmet coffees and various mixed coffee drinks become increasingly popular, people are becoming increasingly dissatisfied with only two coffee choices. For example, a visit to a grocery store coffee section reveals some 20 or more available varieties of coffee beans.

Thus, what is needed is a mechanism by which a user can select from more than just two or three varieties of a brewed beverage such as coffee from an automated beverage brewer/dispenser. In addition, such a mechanism should be inexpensive and reliable.

SUMMARY OF THE INVENTION

In accordance with the present invention, a bypass chute is included with a bulk ingredient beverage brewer/dispenser such that the bypass chute accepts an alternative ingredient directly from a user. In conventional operation, a bulk ingredient is moved through a guide and into a brew device chamber for brewing. However, in a bypass mode, an alternative ingredient is introduced into the bypass chute by the user and the bulk ingredient is not used.

The bypass chute guides the alternative ingredient into the brew device chamber such that a beverage is brewed from the alternative ingredient rather than from the bulk ingredient. The alternative ingredient is moved through the bypass chute by operation of gravity upon the alternative ingredient.

The bypass chute is attached to a bulk ingredient hopper such that the hopper forms a back wall of the bypass chute. A baffle is included to direct the alternative ingredient away from the bulk ingredient hopper and to position the alternative ingredient at a delivery opening at which the bulk ingredient is delivered into the brew device chamber when the bulk ingredient is used.

To brew conventionally using the bulk ingredient, the user presses a button to activate both an auger-based bulk ingredient delivery mechanism and the brew device. To brew using an alternative ingredient, the user introduces the alternative ingredient to the bypass chute and presses a button which activates only the brew device. The bulk ingredient delivery mechanism is not activated such that only the alternative ingredient is used.

BRIEF DESCRIPTION OF THE DRAWINGS

FIG. 2 is a perspective view of the bypass chute of FIG. 1.

FIG. 3 is a front view of the bypass chute of FIG. 1.

FIG. 4 is a side view of the bypass chute of FIG. 1.

DETAILED DESCRIPTION

Figure 1:
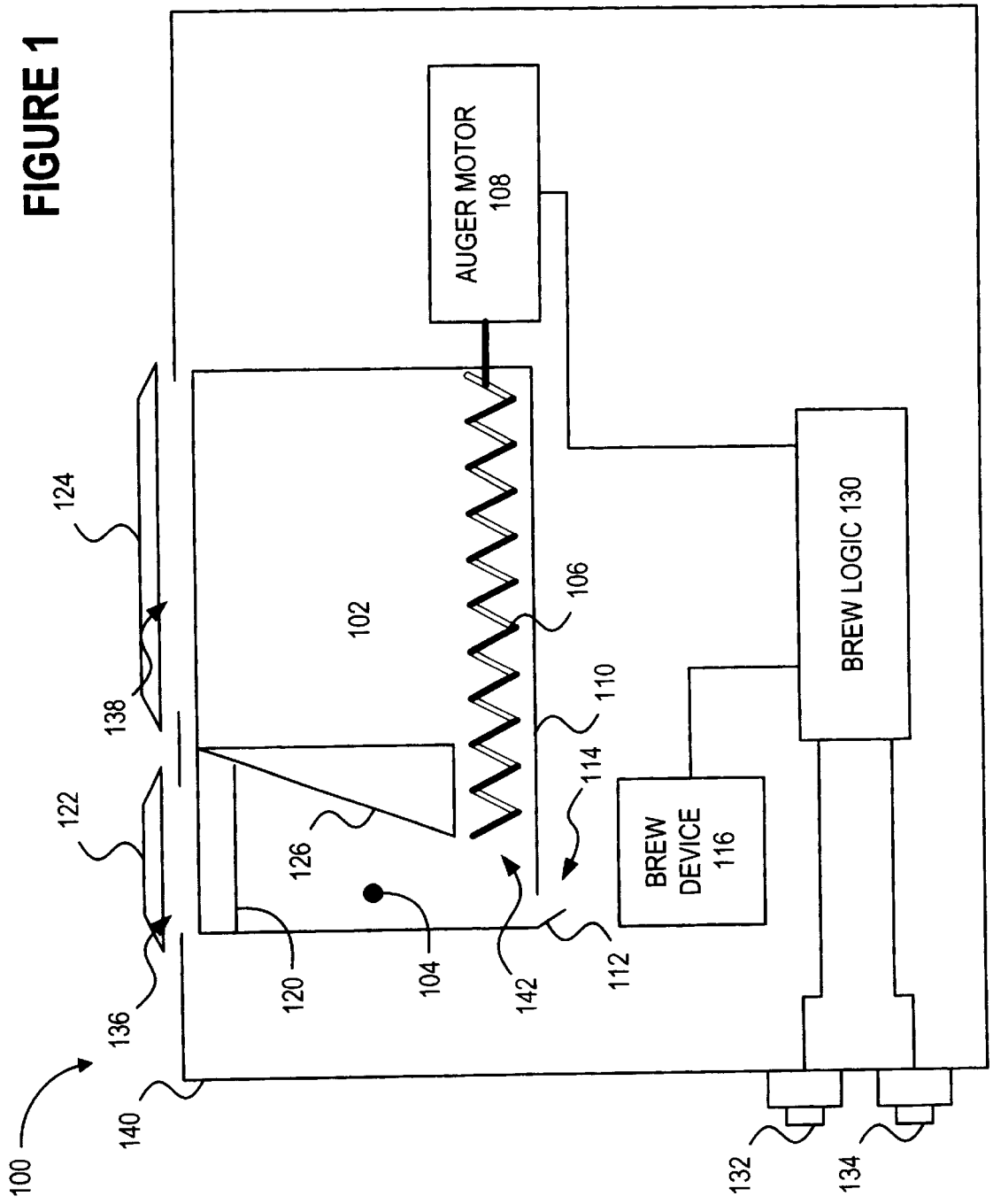
FIG. 1 is a side view of a coffee brewer/dispenser with a bypass chute in accordance with the present invention.

In accordance with the present invention, a chute 104 is attached to a bulk ingredient hopper 102 to provide an alternate pathway for ingredients to reach a brew device 116. While chute 104 is shown in this illustrative embodiment to be attached to bulk ingredient hopper 102, it is appreciated that chute 104 can be independent of, and detached from, bulk ingredient hopper 102. Chute 104 guides an ingredient, such as ground coffee beans for example, from an opening 136 in an outer housing 140 to brew device 116. While opening 136 is shown in this illustrative embodiment to be at the top of coffee brewer/dispenser 100, it is appreciated that opening 136 can also be at the front or side of coffee brewer/dispenser 100. A user can lift a lid 122 and pour the ingredient through opening 136 directly into brew device 116. A grate 120 prevents objects, such as torn pieces of a paper packet holding the ingredient, from falling into brew device 116. A guide member 112 directs the ingredient into brew device and prevents spillage of the ingredient from chute 104 into the remainder of coffee brewer/dispenser 100.

A bulk ingredient, such as a house blend coffee, is stored in bulk ingredient hopper 102. Bulk ingredient hopper 102 is described in U.S. Pat. No. 4,974,751 to King and that description is incorporated herein by reference. Some of the details of hopper 102 are described herein for completeness. In particular, an auger 106, which is a spiral shaped wire auger, is turned by an auger motor 108 to push the bulk ingredient through a cylindrical guide 110 and eventually through a guide opening 142 into brew device 116. While a single bulk ingredient hopper, auger, and auger motor are shown, it is appreciated that multiple bulk ingredient hoppers, augers, and auger motors can be included in the manner described in the '751 Patent. Within brew device 116, the bulk ingredient is mixed with hot water, agitated, filtered, and poured into a cup for the user in the manner described in the '751 Patent.

Brew logic 130 controls operation of auger motor 108 to force an amount of the bulk ingredient into brew device 116 and to initiate operation of brew device 116 to brew the bulk ingredient in hot water. Brew logic 130 initiates the movement of the bulk ingredient and the brewing thereof in response to a detected pressing of a button 132 by the user.

If the user wishes to substitute an alternative ingredient—such as a special, gourmet blend of ground coffee beans—the user pours the alternative ingredient through opening 136 and presses a button 134. The alternative ingredient falls through grate 120, chute 104 and opening 114 into brewing device 116. In response to pressing of button 134, brew logic 130 activates brew device 116 in the manner described above but does not activate auger motor 108. As a result, the bulk ingredient is not added to brew device 116 in response to pressing of button 134.

In an alternative embodiment, a single button is used to initiate brewing by brew device 116 and a separate switch control whether actuation of the single button also initiates movement of the bulk ingredient by auger 106 and auger motor 108. In this alternative embodiment, the user brews a beverage using the bulk ingredient by placing the switch in a "normal" position and pressing the single button. With the switch in the "normal" position, auger motor 108 is activated by pressing the single button. To brew a beverage using an alternative ingredient introduced through chute 104 using this alternative embodiment, the user places the switch in a "bypass" position and presses the single button. With the switch in the "bypass" position, auger motor 108 is not activated by pressing the single button. In either case, brew device 116 is activated by pressing the single button.

Chute 104 of this illustrative embodiment is shown in greater detail in FIG. 2. Chute 104 includes a forward wall 202, side walls 204A–B, and flanges 206A–B. Flanges 206A–B are attachable to bulk ingredient hopper 102 (FIG. 1), e.g., by adhesive or by sheet-metal screws. Thus, chute 104 is defined by bulk ingredient hopper 102 as a back wall, front wall 202 (FIG. 2), and side walls 204A–B.

Chute 104 includes guide member 112 and side guide members 208A–B to guide either the selected ingredient or the bulk ingredient into brew device 116. As shown in FIG. 1 and FIG. 4, guide members 112 and 208A–B are positioned over guide opening 142 to also guide the bulk ingredient into brew device 116 when the bulk ingredient is moved by auger 106 and auger motor 108. In an alternative embodiment, guide members 112 and 208A–B are omitted altogether, and the lower edges of front 202 and sides 204A–B define bottom opening 114 of chute 104. The bottom of chute 104— as defined (i) by guide members 112 and 208A–B or (ii) by the lower edges of front 202 and sides 204A–B—is smaller than a top opening of brew device 116 such that any ingredient guided by chute 104 falls into brew device 116. In this illustrative embodiment, the top of chute 104 is wider than the bottom of chute 104 for easy pour access to the top of chute 104.

Chute 104 also includes a baffle 126 (FIGS. 1 and 4) which guides the selected ingredient poured through chute 104 away from bulk ingredient hopper 102 to the end of cylindrical guide 110 at which guide opening 142 is located. In this illustrative embodiment, baffle 126 is positioned between and attached to side walls 206A–B of chute 104. Baffle 126 can be attached to side walls 206A–B using an adhesive for example.

Figure 5:
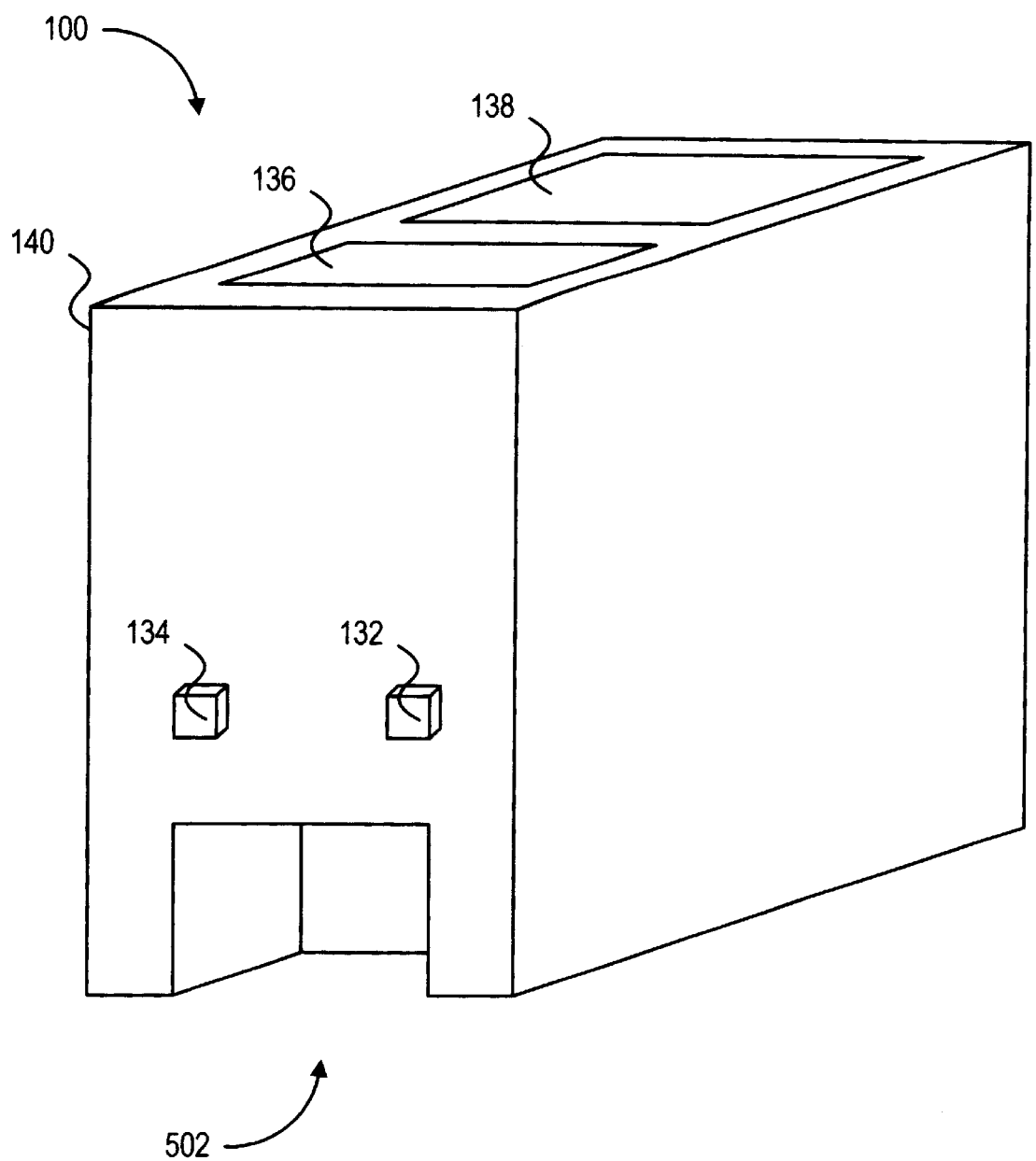
FIG. 5 is a perspective view of the coffee brewer/dispenser of FIG. 1.

In operation, the bulk ingredient is poured though opening 138 (FIG. 5) into coffee brewer/dispenser 100. While stored in bulk ingredient hopper 102 (FIG. 1), the bulk ingredient is ready for use in brewing a beverage in the conventional manner. To brew a beverage from the bulk ingredient, the user simply places a cup in a recess 502 and presses button 132. In response, the beverage is brewed using the bulk ingredient in the manner described above.

In addition to the bulk ingredient, alternative ingredients are made available to a user of coffee brewer/dispenser 100. The alternative ingredients can be packaged in individual, single-serving, paper packets or can be packaged in larger quantities and measured, using a measuring spoon for example, prior to use with coffee brewer/dispenser 100. To brew a beverage from a selected one of the alternative ingredients, the user selects the ingredient and pours the selected ingredient into opening 136. In addition, the user places a cup in recess 502 and presses button 134. In response, coffee brewer/dispenser 100 brews the selected ingredient and does not use the bulk ingredient in the manner described above.

By allowing bypass of the bulk ingredient and addition of a user-selected alternative ingredient, coffee brewer/dispenser 100 provides the user which great flexibility and convenience. For example, alternative beverages are not limited to various caffeinated and decaffeinated blends of ground coffee beans. Instead, alternative beverages can include such things as various teas and tea blends, instant chocolate beverages, powdered apple cider mix, and generally any dry mix which can be added to hot water to make a beverage. Furthermore, while hot water is described as the liquid component of the beverage, it is anticipated that other liquids can be used. However, hot water is the preferred brewing liquid to provide the greatest flexibility as to which ingredients can be used as the bulk ingredient and alternative ingredients.

While chute 104 guides an ingredient directly into brew device 116, it is appreciated that brew device 116 supplied the brewed beverage to a conventional whipper device using conventional techniques or can be replaced with a whipper device altogether. If chute 104 guides an ingredient into a whipper device, it is preferred that the ingredient is wholly soluble such that no grounds or other particulates must be removed from the beverage. However, if brew device 116 provides the beverage to a whipper device, brew device 116 can remove the grounds and/or other particulates.

The above description is illustrative only and is not limiting. The present invention is limited only by the claims which follow.

What is claimed is:

1. A beverage brewing device comprising:

a brew device;

a bulk ingredient storage container for storing a bulk ingredient;

a bulk ingredient delivery guide which is attached to the bulk ingredient storage container and which has an opening positioned so as to enable delivery of the bulk ingredient to the brew device;

a control for initiating delivery of the bulk ingredient from the bulk ingredient storage container, through the bulk ingredient delivery guide, and into the brew device and for initiating brewing by the brew device;

a bypass chute which includes a first opening for receiving an alternative ingredient and a second opening which is positioned so as to direct the alternative ingredient into the brew device directly from the first opening without storage of the alternative ingredient for subsequent use; and a bypass control for initiating brewing by the brew device without initiating delivery of the bulk ingredient into the brew device.

2. The beverage brewing device of claim 1 wherein the alternative ingredient is moved through the bypass chute by operation of gravity upon the alternative ingredient.

3. A bypass chute for use with a beverage brewing device which includes (i) a brew device; (ii) a bulk ingredient storage container for storing a bulk ingredient; and (iii) a bulk ingredient delivery guide which is attached to the bulk ingredient storage container and which has an opening positioned so as to enable delivery of the bulk ingredient to the brew device; the bypass chute comprising:

guides (i) which define a first opening for receiving an alternative ingredient and a second opening and (ii) which direct the alternative ingredient into the brew device directly from the first opening without storage of the alternative ingredient for subsequent use.

4. The bypass chute of claim 3 wherein the alternative ingredient is moved through the bypass chute by operation of gravity upon the alternative ingredient.

5. The beverage brewing device of claim 1 further comprising:

a housing which contains the brew device, the bulk ingredient storage container, the bulk ingredient guide, and the bypass chute and which has an exterior;

wherein the first opening of the bypass chute is accessible from the exterior of the housing.

6. The bypass chute of claim 3 wherein (i) the brew device, (ii) the bulk ingredient storage container, and (iii) the bulk ingredient delivery guide are included within a housing; and further wherein the first opening of the bypass chute is accessible from the exterior of the housing.

7. A beverage brewing device comprising:

a brewing chamber;

a bulk ingredient storage container for storing a bulk ingredient;

a bulk ingredient delivery guide which is attached to the bulk ingredient storage container and which has an opening positioned so as to enable delivery of the bulk ingredient to the brewing chamber;

a control for initiating delivery of the bulk ingredient from the bulk ingredient storage container, through the bulk ingredient delivery guide, and into the brewing chamber and for initiating brewing withing the brewing chamber;

a bypass chute which includes a first opening for receiving an alternative ingredient and a second opening which is positioned so as to direct the alternative ingredient into the brewing chamber; and a bypass control for initiating brewing within the brewing chamber without initiating delivery of the bulk ingredient into the brew device.

8. A bypass chute for use with a beverage brewing device which includes (i) a brewing chamber; (ii) a bulk ingredient storage container for storing a bulk ingredient; and (iii) a bulk ingredient delivery guide which is attached to the bulk ingredient storage container and which has an opening positioned so as to enable delivery of the bulk ingredient to the brewing chamber; the bypass chute comprising:

guides (i) which define a first opening for receiving an alternative ingredient and a second opening and (ii) which direct the alternative ingredient into the brewing chamber.

* * * * *